(12) United States Patent
Park et al.

(10) Patent No.: US 9,373,832 B2
(45) Date of Patent: Jun. 21, 2016

(54) SPACER FOR BATTERY PACK AND BATTERY PACK COMPRISING THE SAME

(75) Inventors: Youngsun Park, Daejeon (KR);
SooRyoung Kim, Daejeon (KR);
Seunghyun Bang, Seoul (KR); Won Joon Choi, Chungcheongbuk-do (KR)

(73) Assignee: LG CHEM, LTD., Seoul (KR)

( * ) Notice: Subject to any disclaimer, the term of this patent is extended or adjusted under 35 U.S.C. 154(b) by 367 days.

(21) Appl. No.: 13/143,237

(22) PCT Filed: Jan. 6, 2010

(86) PCT No.: PCT/KR2010/000046
§ 371 (c)(1),
(2), (4) Date: Oct. 21, 2011

(87) PCT Pub. No.: WO2010/079938
PCT Pub. Date: Jul. 15, 2010

(65) Prior Publication Data
US 2012/0028084 A1    Feb. 2, 2012

(30) Foreign Application Priority Data
Jan. 6, 2009    (KR) .......................... 10-2009-0000689

(51) Int. Cl.
*H01M 10/48*    (2006.01)
*H01M 2/00*    (2006.01)
(Continued)

(52) U.S. Cl.
CPC ................ *H01M 2/34* (2013.01); *H01M 2/105* (2013.01); *H01M 2/348* (2013.01); *H01M 10/486* (2013.01); *H01M 2200/00* (2013.01); *H01M 2200/10* (2013.01)

(58) Field of Classification Search
None
See application file for complete search history.

(56) References Cited

U.S. PATENT DOCUMENTS

| 5,585,710 | A | 12/1996 | Nakamura et al. |
| 7,410,294 | B2 * | 8/2008 | Shiraki et al. ................. 374/208 |

(Continued)

FOREIGN PATENT DOCUMENTS

| CN | 1297590 A | 5/2001 |
| GB | 2 281 810 A | 3/1995 |

(Continued)

*Primary Examiner* — Daniel Gatewood
(74) *Attorney, Agent, or Firm* — Birch, Stewart, Kolasch & Birch, LLP

(57) ABSTRACT

Disclosed herein is a spacer used in a battery pack having a plurality of battery cells mounted in a pack case, wherein the spacer is configured to have a top shape corresponding to the inner shape of the pack case in vertical section and a bottom shape corresponding to the outer circumferential shape of the battery cells in vertical section so that the spacer can be mounted in a space defined between the battery cells and the pack case, grooves, in which electrical connection members are mounted, are formed at the top of the spacer, and the spacer includes at least one temperature detection member mounting part including a horizontal opening open in one direction or in opposite directions and a vertical opening communicating with the horizontal opening so that a temperature detection member is inserted from one side of the spacer and mounted in a space defined between the battery cells. In the spacer, the temperature detection member is inserted into the horizontal opening from one side of the spacer so that the temperature detection member can be fixed between the battery cells and the spacer, and therefore, a process of bonding the temperature detection member is omitted. Also, the electrical connection members for electrical connection between the battery cells and between the battery cells and a protection circuit member are mounted in the grooves so that the electrical connection members are fixed in an insulated state, thereby preventing the occurrence of a short circuit due to vibration or impact and simplifying an assembly process.

15 Claims, 6 Drawing Sheets

(51) Int. Cl.
  *H01M 2/10* (2006.01)
  *H01M 2/34* (2006.01)

(56) References Cited

U.S. PATENT DOCUMENTS

| | | |
|---|---|---|
| 2002/0150815 A1 | 10/2002 | Ehara |
| 2003/0077486 A1* | 4/2003 | Iwaizono et al. ................ 429/7 |
| 2007/0190405 A1* | 8/2007 | Kang et al. ..................... 429/99 |

FOREIGN PATENT DOCUMENTS

| | | | |
|---|---|---|---|
| JP | 7-85896 A | | 3/1995 |
| JP | 07085896 A | * | 3/1995 |
| JP | 10-269916 A | | 10/1998 |
| JP | 2002-100411 A | | 4/2002 |
| JP | 2002-313295 A | | 10/2002 |
| JP | 2003-323870 A | | 11/2003 |
| JP | 2003323870 A | * | 11/2003 |
| JP | 2005-93255 A | | 4/2005 |
| JP | 2005093255 A | * | 4/2005 |
| KR | 10-2001-0043946 B1 | | 5/2001 |
| KR | 10-0484420 B1 | | 4/2005 |
| KR | 10-2007-0081602 A | | 8/2007 |
| WO | 2006/118281 A1 | | 11/2006 |

* cited by examiner

SPACER FOR BATTERY PACK AND BATTERY PACK COMPRISING THE SAME

TECHNICAL FIELD

The present invention relates to a spacer for battery packs and a battery pack including the same, and, more particularly, to a spacer used in a battery pack having a plurality of battery cells mounted in a pack case, wherein the spacer is configured to have a top shape corresponding to the inner shape of the pack case in vertical section and a bottom shape corresponding to the outer circumferential shape of the battery cells in vertical section, grooves, in which electrical connection members are mounted, are formed at the top of the spacer, and the spacer includes at least one temperature detection member mounting part including a horizontal opening open in one direction or in opposite directions and a vertical opening communicating with the horizontal opening and a battery pack including the same.

BACKGROUND ART

As mobile devices have been increasingly developed, and the demand for such mobile devices has increased, the demand for secondary batteries as an energy source has also sharply increased.

Depending upon kinds of external devices in which secondary batteries are used, the secondary batteries may be used in the form of a single battery or in the form of a battery pack having a plurality of unit cells electrically connected to one another. For example, small-sized devices, such as mobile phones, can be operated for a predetermined period of time with the power and the capacity of one battery. On the other hand, a battery pack needs to be used in middle or large-sized devices, such as laptop computers, portable digital versatile disc (DVD) players, small-sized personal computers (PCs), electric vehicles and hybrid electric vehicles, because high power and large capacity are necessary for the middle or large-sized devices.

A battery pack is manufactured by connecting a protection circuit to a core pack having a plurality of unit cells (secondary batteries) connected in series and/or in parallel to each other. In a case in which prismatic batteries or pouch-shaped batteries are used as the unit cells, the prismatic batteries or the pouch-shaped batteries are stacked so that large-sized surfaces of the prismatic batteries or the pouch-shaped batteries face each other, and then electrode terminals of the prismatic batteries or the pouch-shaped batteries are connected to each other by connection members, such as bus bars. In a case in which a three-dimensional secondary battery pack having a hexahedral structure is to be manufactured, therefore, the prismatic secondary batteries or the pouch-shaped secondary batteries are preferably used as unit cells of the battery pack.

On the other hand, cylindrical secondary batteries generally have larger electric capacities than the prismatic secondary batteries or the pouch-shaped secondary batteries. However, it is difficult to arrange the cylindrical secondary batteries in a stacked structure due to the external shape of the cylindrical secondary batteries. In a case in which a secondary battery pack is configured generally in a line type structure or in a plane type structure, though, the cylindrical secondary batteries are structurally more advantageous than the prismatic batteries or the pouch-shaped batteries.

Consequently, a battery pack having a plurality of cylindrical secondary batteries connected in series or in parallel and series to each other is widely used in laptop computers, portable DVD players and portable PCs. The battery pack may be configured in various core pack structures. For example, the core pack of the battery pack may be generally configured in a 2P (parallel)-3S (series) line type structure, a 2P-3S plane type structure, a 2P-4S line type structure, a 2P-4S plane type structure, a 1P-3S line type structure or a 1P-3S plane type structure.

The parallel connection structure is achieved by arranging two or more cylindrical secondary batteries in the lateral direction thereof so that the cylindrical batteries are adjacent to each other in a state in which electrode terminals of the cylindrical secondary batteries are oriented in the same direction and connecting the electrode terminals of the cylindrical batteries to each other via connection members by welding. The cylindrical batteries connected in parallel to each other may be referred to as a "bank."

The series connection structure is achieved by arranging two or more cylindrical secondary batteries in the longitudinal direction thereof so that electrode terminals of the cylindrical secondary batteries having opposite polarities are successively disposed one after another, or arranging two or more cylindrical secondary batteries in the lateral direction thereof so that the cylindrical secondary batteries are adjacent to each other in a state in which electrode terminals of the cylindrical secondary batteries are oriented in opposite directions, and connecting the electrode terminals of the cylindrical secondary batteries to each other via connection members by welding.

The electrical connection between the cylindrical secondary batteries is generally achieved by spot welding using thin connection members (for example, metal plates), such as nickel plates.

FIG. 1 is a typical view illustrating a state in which a battery pack is configured in a 2P-3S plane type structure after electrical connection is completed using spot welding. For easy understanding, a coupling relation of the battery pack configured in the 2P-3S plane type structure is shown as an exploded view in FIG. 1.

As shown in FIG. 1, three pairs of secondary batteries 20 and 21, which are connected in parallel to each other for each pair, are connected in series to each other via metal plates 30 to constitute a core pack 10.

FIG. 2 is a typical view illustrating a battery module 50 in which a protection circuit module is connected to the core pack of FIG. 1.

As shown in FIG. 2, the secondary batteries 20 and 21 are connected to the protection circuit module 90 via a cathode lead wire 60, an anode lead wire 70 and a flexible printed circuit board (FPCB) 80 connected to the metal plates 300. The electrical connection of the protection circuit module 90 to the metal plates 30 is achieved mainly by soldering.

Generally, a battery pack using secondary batteries as unit cells is repeatedly charged and discharged during the use of the battery pack, and the battery pack uses lithium secondary battery, which exhibits low safety in abnormal conditions, such as external impact, dropping, penetration of a needle-shaped body, overcharge, overcurrent, etc., as a unit cell. In order to solve such a safety-related problem, therefore, a safety element, such as a protection circuit module, is included in the battery pack. The safety element acquires information, such as voltage, at a corresponding terminal connection region of the battery pack to perform a predetermined safety process, thereby securing the safety of the battery pack.

Also, safety of the second batteries is greatly lowered at low temperature. For this reason, a temperature detection member is mounted on a unit cell to measure the temperature of the unit cell, and the operation of the battery pack is controlled through the safety element, such as the protection circuit module, based on information obtained from the temperature detection member.

The temperature detection member is fixed to the outside of the unit cell by a bonding agent or an adhesive tape so that the temperature detection member can stably measure the temperature of the unit cells.

However, such a process of attaching the temperature detection member to the outside of the unit cell using the bonding agent or the adhesive tape is troublesome and complicates a process of manufacturing a battery pack.

Also, the temperature detection member attached to the outside of the unit cell using the bonding agent or the adhesive tape may be separated from the outside of the unit cell due to various causes, such as moisture, temperature change or external impact, with the passage of time with the result that a temperature detecting function of the temperature detection member may be deteriorated.

Consequently, there is a high necessity for a technology that is capable of improving manufacturing efficiency of a battery pack and maintaining a state in which the temperature detection member is stably mounted to the unit cells even under abnormal conditions, such as moisture, temperature change or external impact.

DISCLOSURE

Technical Problem

Therefore, the present invention has been made to solve the above problems, and other technical problems that have yet to be resolved.

As the result of a variety of extensive and intensive studies and experiments to solve the problems as described above, the inventors of the present application have found that, when a spacer including at least one temperature detection member mounting part including a horizontal opening open in one direction or in opposite directions and a vertical opening communicating with the horizontal opening so that a temperature detection member is inserted from one side of the spacer and mounted in a space defined between the battery cells is used in a battery pack, it is possible to improve manufacturing efficiency of a battery pack and to stably maintain a state in which the temperature detection member are fixed to the unit cells. The present invention has been completed based on these findings.

Technical Solution

In accordance with one aspect of the present invention, the above and other objects can be accomplished by the provision of a spacer used in a battery pack having a plurality of battery cells mounted in a pack case, wherein the spacer is configured to have a top shape corresponding to the inner shape of the pack case in vertical section and a bottom shape corresponding to the outer circumferential shape of the battery cells in vertical section so that the spacer can be mounted in a space defined between the battery cells and the pack case, grooves, in which electrical connection members are mounted, are formed at the top of the spacer, and the spacer includes at least one temperature detection member mounting part including a horizontal opening open in one direction or in opposite directions and a vertical opening communicating with the horizontal opening so that a temperature detection member is inserted from one side of the spacer and mounted in a space defined between the battery cells.

That is, the top and the bottom of the spacer are configured in shapes corresponding to the inner shape of the pack case and the outer circumferential shape of the battery cells. Consequently, it is possible to prevent the battery cells from being shaken and moved by external impact in the space defined between the battery cells and the pack case and to stably fix the battery cells in position.

Also, the temperature detection member is inserted into the horizontal opening from one side of the spacer so that the temperature detection member can be fixed between the battery cells and the spacer. Consequently, it is possible to omit a process of attaching the temperature detection member to the outside of the battery cell using a bonding agent or an adhesive tape. Also, it is possible to stably maintain a fixed state of the temperature detection member even under abnormal conditions, such as moisture, temperature change or external impact.

In addition, the grooves, in which the electrical connection members are mounted, are formed at the top of the spacer. Consequently, it is possible to easily and stably mount connection members, which are provided for electrical connection between the battery cells and electrical connection between a protection circuit module and the battery cells, in the grooves, thereby improving manufacturing efficiency and quality of a battery pack.

The length of the spacer is not particularly restricted. For example, the spacer may have a length approximately equal to or greater than the length of each of the battery cells. According to circumstances, the length of the spacer may be 1.5 times the length of each of the battery cells, not integral multiples, such as one time, two times or three times, the length of each of the battery cells.

Preferably, each of the battery cells is a cylindrical battery cell, and the spacer has a width by which opposite sides of the spacer extend to middle regions of two neighboring battery cells, respectively. The term 'middle region' does not mean the exact middle position of each of the battery cells. Consequently, the width of the spacer may be equivalent to 40 to 80% of the total width of the two battery cells. Preferably, the spacer is configured in a symmetrical fashion.

The material for the spacer is not particularly restricted so long as the spacer is made of an electrically insulative material. For example, the spacer may be made of a polymer resin, such as polycarbonate (PC) or acrylonitrile butadiene styrene (ABS). The polymer resin may be injection molded or extrusion molded and may be then cut into a predetermined size to easily manufacture a spacer.

In order to achieve more stable mounting of the spacer to the battery cells in position or to secure stable mounting of the battery cells to the pack case, the spacer may further include ribs configured to have a length corresponding to the distance between the middle region and the outside end of each of the battery cells and a shape corresponding to the outer circumference of each of the battery cells. The ribs may be formed at opposite sides of the spacer in a symmetrical fashion. Alternatively, the ribs may be formed at only a portion of the spacer.

On the other hand, a pressing rib may be formed at the temperature detection member mounting part so that the pressing rib extends toward the vertical opening of the temperature detection member mounting part. The temperature detection member is pressed by the pressing rib so that the temperature detection member can be more stably mounted on the battery cells.

As previously described, the grooves, in which the electrical connection members are mounted, are formed at the top of the spacer according to the present invention. Each of the electrical connection members, which are mounted in the grooves, may be a conductive metal material, preferably a metal plate formed in the shape of a strip. The metal plate may be configured to have an inverse T type structure to electrically connect the battery cells arranged in the lateral direction.

For easy wiring in the battery pack and structural simplification, the spacer is preferably provided at the top thereof with a groove formed in the longitudinal direction of the battery cells. More preferably, at least one groove (branch groove) diverges from the groove in the lateral direction of the battery cells. The branch groove enables simple and easy wiring when the electrical connection member, mounted in the groove formed in the longitudinal direction of the battery cells, is to be electrically connected to a predetermined device or member as needed.

Preferably, the width of the groove and the branch groove is equivalent to the width of each of the electrical connection members and the depth of the groove and the branch groove is approximately equivalent to the thickness of each of the electrical connection members so that the electrical connection members are stably mounted in the groove and the branch groove. However, it is not necessary for the width and depth of the longitudinal groove to be equal to those of the branch groove.

In the related art, a fixing method using an adhesive tape is used to prevent the occurrence of a short circuit in the battery pack due to vibration or impact. In the conventional method, however, the electrical connection members may easily be out of position due to external force with the result that a short circuit may occur in the battery pack. On the other hand, when the electrical connection members are mounted in the groove, the electrical connection members are inserted and fixed in the depressed portion of the groove, thereby securing safety of the battery pack.

In a preferred example, each of the electrical connection members may be bent so as to correspond to the groove and the branch groove. In this case, the electrical connection between the battery cells and the electrical connection between the battery cells and another device or member (for example, a protection circuit member) may be achieved using a single electrical connection member.

In a structure in which the length of the spacer is greater than that of each of the battery cells, on the other hand, a through hole, through which each of the electrical connection members is inserted, may be formed at a position corresponding to each electrode terminal connection region between the battery cells arranged in the longitudinal direction thereof.

According to circumstances, the spacer may be provided at one side thereof with a slit extending in the lateral direction thereof so as to communicate with the through hole. By the provision of the slit, it is possible to easily insert the electrical connection member from the side of the spacer and easily locate in the through hole.

The structure of the horizontal opening of the temperature detection member mounting part is not particularly restricted so long as the horizontal opening of the temperature detection member mounting part is open in one direction or in opposite directions. For example, the horizontal opening of the temperature detection member mounting part may be open in the direction in which the battery cells are arranged in consideration of convenience in manufacturing the spacer.

In this structure, horizontal openings are preferably formed at opposite sides of the vertical opening.

Meanwhile, a bonding agent, a molten resin or a curable resin may be injected through the vertical opening to fix a portion of the temperature detection member to the temperature detection member mounting part preferably in a state in which the temperature detection member is inserted through the horizontal opening of the temperature detection member mounting part so that the temperature detection member inserted through the horizontal opening is more stably fixed to the battery cells.

It is possible to securely maintain the fixing between the battery cells and the spacer in addition to the temperature detection member through fixing of the temperature detection member using the bonding agent, the molten resin or the curable resin.

The temperature detection member is not particularly restricted so long as the temperature detection member is mounted between the pack case and the battery cells to measure temperature of the battery cells. Preferably, the temperature detection member is a thermistor.

In accordance with another aspect of the present invention, there is provided a battery pack having the spacer mounted between battery cells and a pack case.

In the battery pack, a temperature detection member mounting part including a horizontal opening and a vertical opening is formed at the spacer. Consequently, it is possible to stably fix a temperature detection member to the pack case even under abnormal conditions, such as moisture, temperature change or external impact. In addition, the grooves, in which the electrical connection members are mounted, are formed at the top of the spacer. Consequently, it is possible to improve manufacturing efficiency and quality of the battery pack.

The battery pack according to the present invention may have various structures. For example, the battery cells may be arranged in the longitudinal direction and in the lateral direction, and a protection circuit member may be mounted to the outside of one side of an assembly of the battery cells arranged in the longitudinal direction.

In order to easily achieve electrical connection between the battery cells and the protection circuit member, the protection circuit member may be configured in a structure in which a conductive connection member is coupled to a region at which the electrical connection member is connected in an extending state or in a structure in which a conductive connection plate is attached to a region at which the electrical connection member is connected.

The conductive connection member may be coupled to the protection circuit member, for example, by soldering. However, the coupling method is not limited to soldering.

For example, the electrical connection member connected to the protection circuit member may be a single member, which may be successively mounted in the groove and the branch groove to secure stable connection in a simple structure.

An element to perform a process of achieving safety of the battery pack, such as a temperature detection member, may be connected to the protection circuit member.

In a preferred example, the pack case may be provided with an injection port communicating with the vertical opening of the spacer. Consequently, it is possible to inject a bonding agent, a molten resin or a curable resin through the injection port of the pack case even in a state in which the battery cells are mounted in the pack case in a sealed state with the result that the spacer is more stably fixed to the pack case.

The battery pack according to the present invention may be used as a power source for middle-sized devices, such as portable DVD players and small-sized PCs, which require high power and large capacity. However, the battery pack according to the present invention may be used in other applications.

Particularly preferably, the battery pack according to the present invention is used as a power source for laptop computers. In accordance with a further aspect of the present invention, therefore, there is provided a laptop computer including the battery pack as a power source.

The general structure and a manufacturing method of a laptop computer are well known in the art to which the present invention pertains, and therefore, a further description thereof will not be given.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
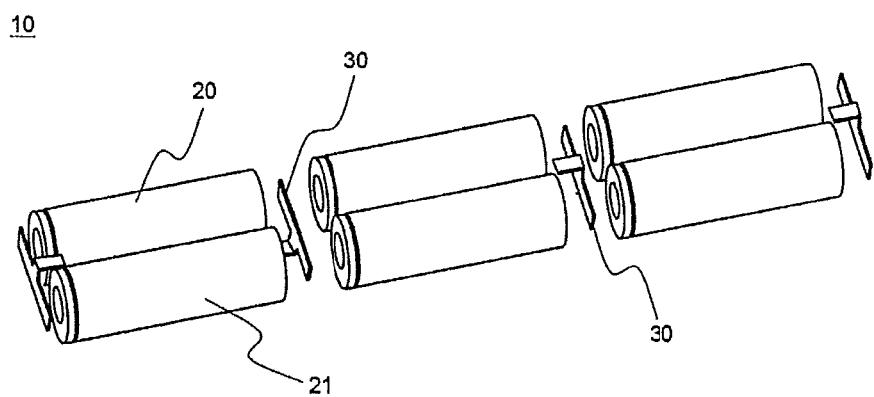
FIG. 1 is an exploded view illustrating the coupling between batteries electrically connected to each other via conventional connection members, such as metal plates.
Figure 2:
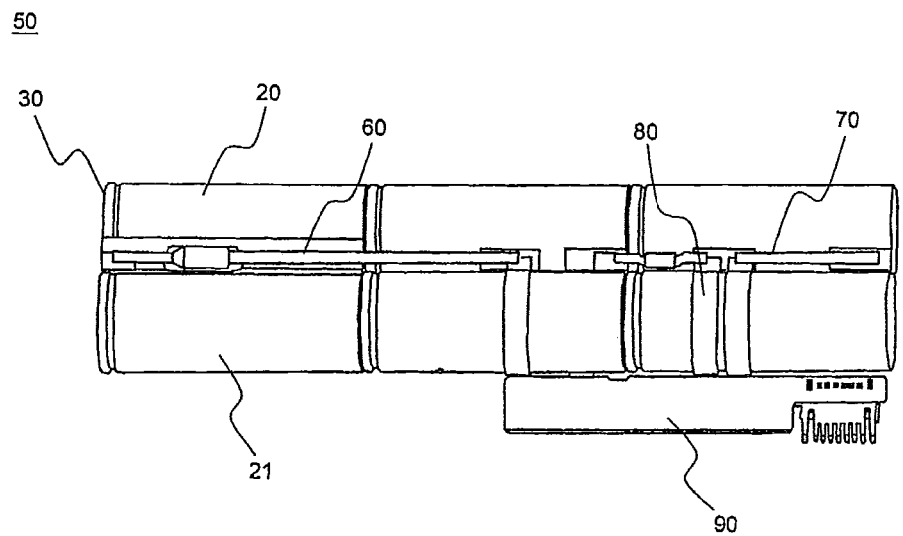
FIG. 2 is a typical view illustrating a battery module in which a protection circuit module is connected to a core pack of FIG. 1.
Figure 3:
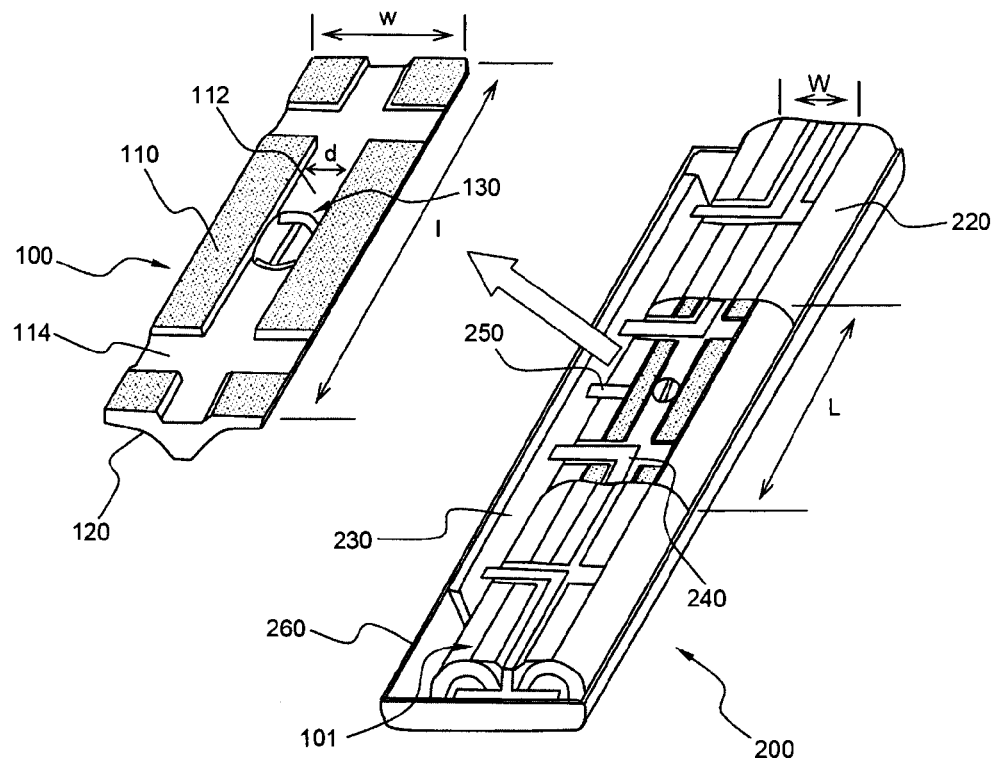
FIG. 3 is a typical view illustrating a spacer according to an embodiment of the present invention and a battery pack in which the spacer is mounted.
Figure 4:
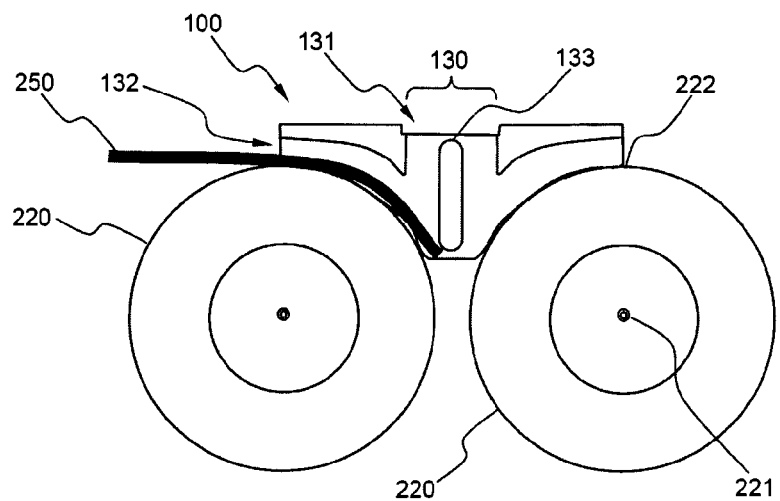
FIG. 4 is a vertical sectional view illustrating a temperature detection member mounting part of FIG. 3.

FIG. 3 is a typical view illustrating a spacer according to an embodiment of the present invention and a battery pack in which the spacer is mounted, and FIG. 4 is a vertical sectional view typically illustrating a temperature detection member mounting part of FIG. 3.

Referring first to FIG. 3, a battery pack 200 includes six battery cells 220 mounted on a lower pack case 260 in a 2P-3S connection structure. Also, a protection circuit member 230 is mounted at one side of an assembly of the battery cells 220 in the longitudinal direction of the battery cell assembly 220. A temperature detection member 250 is connected to the protection circuit member 230.

A spacer 100 is configured to have a shape of the top of the spacer 100 corresponding to the inner shape (flat shape) of the upper pack case in vertical section and a shape of the bottom of the spacer 100 corresponding to the outer circumferential shape (arc shape) of the battery cells 220 in vertical section so that the spacer 100 can be mounted in a space defined between the battery cell assembly 220 and an upper pack case (not shown). Grooves 112 and 114, in which electrical connection members 240 are mounted, are formed at the top of the spacer 100.

That is, the spacer 100 is configured to have a structure in which the bottom of the spacer 100 is upwardly tapered toward opposite sides of the spacer 100. Each of the upwardly tapered planes is configured in an arc shape corresponding to the outer circumference of a corresponding one of the battery cells 220.

The spacer 100 is made of an insulative material. For example, the spacer 100 may be made of a polymer resin, which is electrically insulative, lightweight and exhibits high heat resistance, such as polycarbonate (PC) or acrylonitrile butadiene styrene (ABS).

The length l of the spacer 100 is approximately equal to the length L of a cylindrical battery cell 220. The width w of the spacer 100 corresponds to the distance W between the middle regions of two neighboring battery cells 220. Consequently, opposite sides of the spacer 100 are located at the middle regions of the two neighboring battery cells 220, respectively.

Also, the groove 112, which corresponds to the width d of each of the electrical connection members 240, is formed at the top 110 of the spacer 100 in the longitudinal direction of the battery cells 220. In addition, two branch grooves 114 are formed at the top 111 of the spacer 100 so that the branch grooves 114 intersect the groove 112 in the lateral direction of the battery cells 220.

Referring to FIG. 4, the spacer 100 includes a temperature detection member mounting part 130, which includes a horizontal opening 132 open in opposite directions and a vertical opening 131 communicating with the horizontal opening 132. Also, a pressing rib 133 extends toward the vertical opening 131.

Consequently, the temperature detection member 250 can be easily inserted through the horizontal opening 132. In an inserted state of the temperature detection member 250, the temperature detection member 250 is pressed by the pressing rib 133 so that the temperature detection member 250 can be stably mounted on the battery cells 220.

Figure 5:
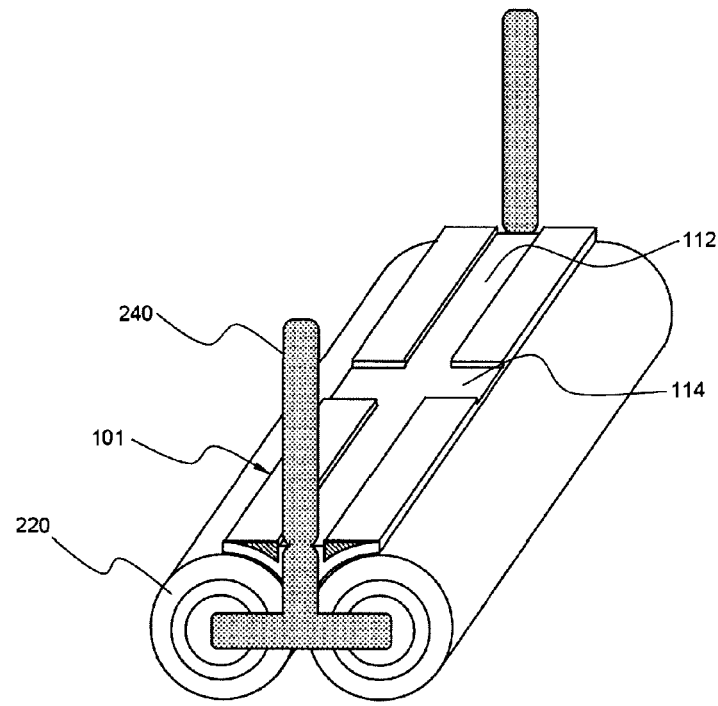
FIGS. 5 and 6 are typical views illustrating forms in which electrical connection members are connected to battery cells to which a spacer is mounted.
Figure 6:
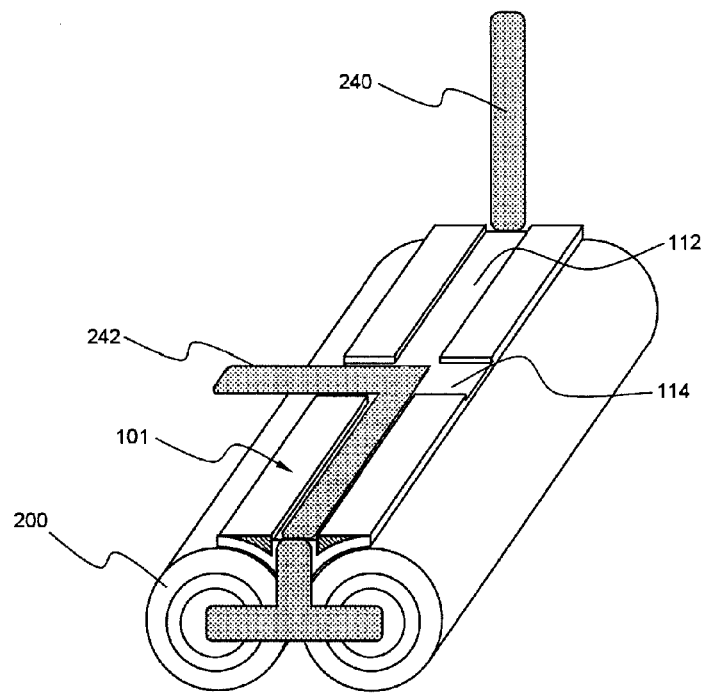

FIGS. 5 and 6 are typical views illustrating forms in which electrical connection members are connected to battery cells to which a spacer is mounted.

A spacer 101, having no temperature detection member mounting part, of FIG. 3 is shown in FIGS. 5 and 6 in order to explain that only the electrical connection members are mounted to the spacer.

Referring first to FIG. 5, each of the electrical connection members 240 is a metal plate formed in the shape of a strip having an inverse T type structure to electrically connect the battery cells 220 arranged in the lateral direction.

A groove 112 is formed at the top of the spacer 101 in the longitudinal direction of the battery cells 220. At least one groove (branch groove) 114 diverges from the groove 112 in the lateral direction of the battery cells 220. The width of the groove 112 and the branch groove 114 corresponds to the width of the electrical connection members 240 so that the electrical connection members 240 can be fixedly mounted in the groove 112 and the branch groove 114. Also, the depth of the groove 112 and the branch groove 114 approximately corresponds to the thickness of each of the electrical connection members 240.

During assembly of a battery pack, the electrical connection members 240, electrically connecting the battery cells 220, are bent at the respective ends of the spacer 101 and mounted in the longitudinal groove 112.

Each of the electrical connection members 240 may be configured to have a structure in which a one-side portion of each of the electrical connection members 240 is mounted only in the longitudinal groove 112. According to circumstances, on the other hand, at least one of the electrical connection members 240 may be configured to have a structure in which a one-side portion of each of the electrical connection members 240 is bent in a shape corresponding to the groove 112 and the branch groove 114 as shown in FIG. 6. An electrical connection member 242 of FIG. 6, which electrically connects the battery cells 220, can be connected to a protection circuit member (not shown) via the branch groove 114. Consequently, the overall structure is stable and simple.

Figure 7:
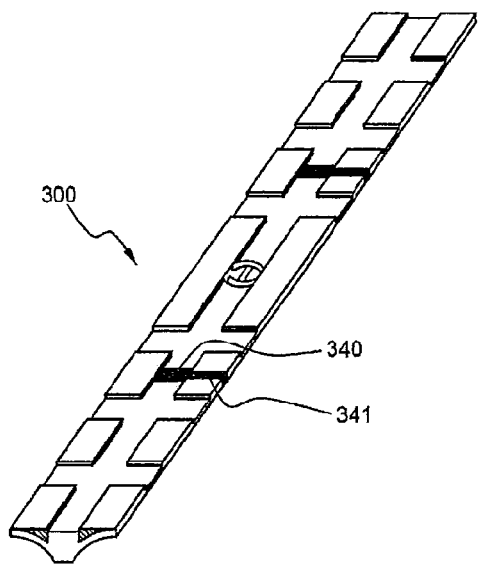
FIG. 7 is a perspective view illustrating a spacer according to another embodiment of the present invention.

FIG. 7 is a perspective view illustrating a spacer according to another embodiment of the present invention.

Referring to FIG. 7, the length of a spacer 300 is greater than that of each battery cell (not shown). In this structure, a through hole 340, through which a one-side portion of each electrical connection member (not shown) is inserted, is formed at a position corresponding to each electrode terminal connection region between battery cells arranged in the longitudinal direction thereof.

As shown in FIG. 7, the spacer 300 is provided at one side thereof with a slit 341 extending in the lateral direction thereof so as to communicate with the through hole 340. By the provision of the slit 341 communicating with the through hole 340, it is possible to easily insert the electrical connection member from the side of the spacer and easily locate in the through hole 340. On the other hand, it is possible to easily mount the spacer 300 to the battery cells in a state in which the electrical connection member is connected to the battery cells. The connection of the electrical connection member to the battery cells is achieved mainly by welding.

Figure 8:
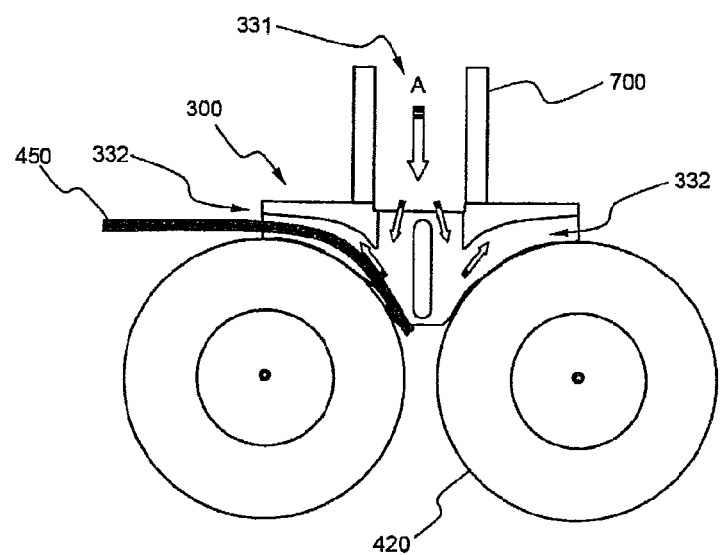
FIG. 8 is a vertical sectional view illustrating a temperature detection member mounting part disposed between the spacer of FIG. 7 and the battery cells.

FIG. 8 is a vertical sectional view illustrating a temperature detection member mounting part disposed between the spacer of FIG. 7 and the battery cells.

Referring to FIG. 8, the fixing between a temperature detection member 450 and the battery cells 420 and between the spacer 300 and the battery cells 420 is stably achieved by injecting a bonding agent, a molten resin or a curable resin A through a vertical opening 331 of the temperature detection member mounting part of the spacer 300.

Specifically, when a predetermined injection member 700 is located on the vertical opening 331 of the temperature detection member mounting part and the bonding agent A is injected through the vertical opening 331, the bonding agent A flows downward. At this time, some of the bonding agent A flows to a horizontal opening 332. As a result, the vertical opening 331 and the horizontal opening 332 are filled with the bonding agent A. As the bonding agent A is cured, the temperature detection member 450 and the spacer 300 are stably fixed to the battery cells 420.

Figure 9:
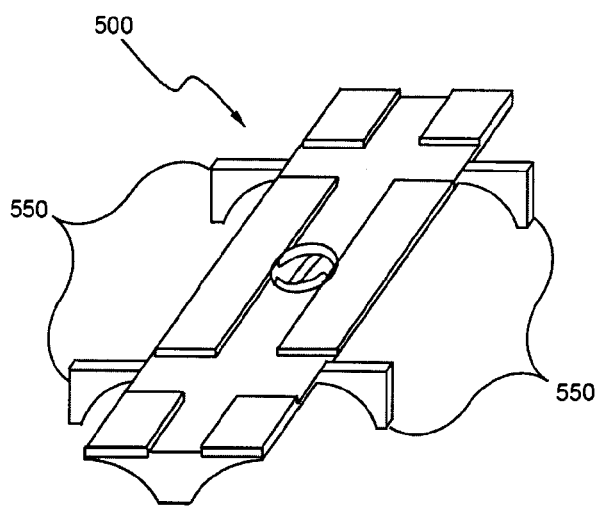
FIG. 9 is a perspective view illustrating a spacer with extended ribs according to a further embodiment of the present invention.
Figure 10:
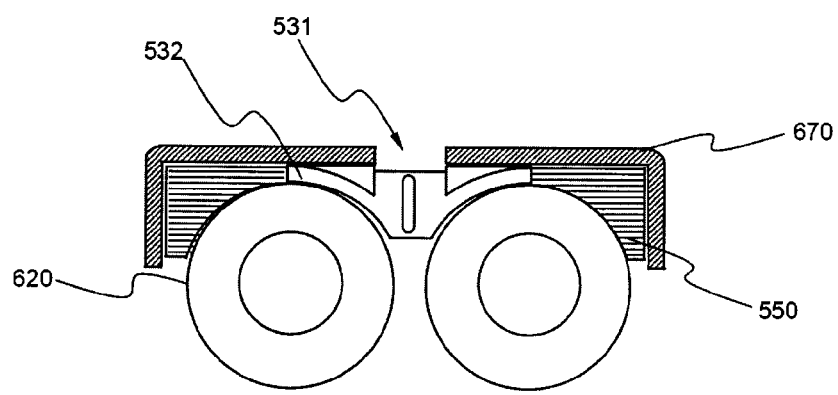
FIG. 10 is a vertical sectional view typically illustrating a form in which the spacer with the extended ribs according to the further embodiment of the present invention is mounted in a back case.

FIGS. 9 and 10 are views typically illustrating a spacer according to a further embodiment of the present invention and a structure in which the spacer is mounted to battery cells.

Referring to these drawings, a spacer 500 includes ribs 550 configured to have a length corresponding to the distance between the middle region and the outside end of each battery cell 620 and a shape corresponding to the outer circumference of the battery cell 620. The ribs 550 extend from opposite sides of a main body of the spacer 500 in a symmetrical fashion. The ribs 550 fills a gap between a pack case 670 and the spacer 500 in the lateral direction of the battery cells 620 so that the spacer 500 is fixed to the pack case 670, thereby achieving more stable fixing of the battery cells 620. In a case in which the pack case 670 is provided at the inside thereof with depressions (not shown) corresponding to the respective ribs 550, it is possible to achieve more stable mounting of the spacer 500 to the pack case 670.

Figure 11:
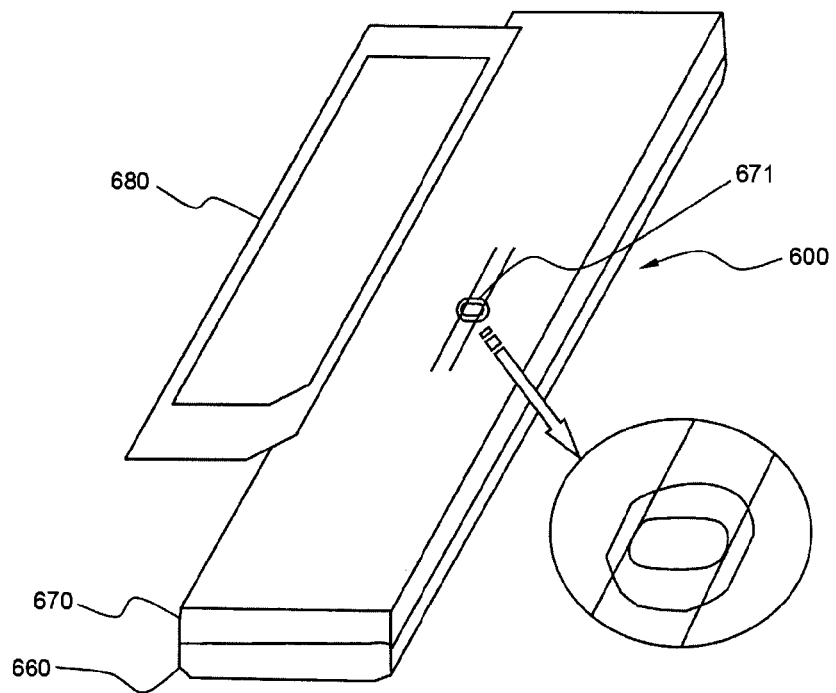
FIG. 11 is a perspective view illustrating a state in which the spacer according to the present invention and the battery cells are mounted between an upper pack case and a lower pack case according to an embodiment of the present invention.

FIG. 11 is a perspective view typically illustrating a state in which the spacer according to the present invention and the battery cells are mounted between an upper pack case and a lower pack case according to an embodiment of the present invention.

Referring to FIG. 11, an injection port 671, communicating with the vertical opening (not shown) of the spacer, is formed at a middle region of an upper pack case 670 of a battery pack. A bonding agent is injected through the injection port 671 and a label 680 to cover the injection port 671 is attached to the upper pack case 670. As a result, the battery pack 600 is completed.

The bonding agent, injected through the injection port 671 of the upper pack case 670, stably fixes the temperature detection member and the spacer to the battery cells through the process previously described with reference to FIG. 8.

INDUSTRIAL APPLICABILITY

As is apparent from the above description, the spacer according to the present invention includes a temperature detection member mounting part, which including a horizontal opening open in one direction or in opposite directions and a vertical opening communicating with the horizontal opening, and grooves for electrical connection. Consequently, it is possible to stably maintain fixing of a temperature detection member and electrical connection members to unit cells, thereby improving manufacturing efficiency and quality of a battery pack.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:
1. A battery pack, comprising:
a pack case;
battery cells in the pack case; and
a spacer mounted between the battery cells and the pack case, wherein
the spacer is configured to have a top shape corresponding to the inner shape of the pack case in vertical section and a bottom shape corresponding to the outer circumferential shape of the battery cells in vertical section so that the spacer can be mounted in a space defined between the battery cells and the pack case,
the top shape is flat,
grooves, in which electrical connection members for directly connecting the battery cells to each other are mounted, are formed at the top of the spacer,
the spacer comprises at least one temperature detection member mounting part comprising a horizontal opening open in one direction or in opposite directions and a vertical opening communicating with the horizontal opening so that a temperature detection member is inserted from one side of the spacer and mounted in a space defined between the battery cells from one side of the spacer, the length of the spacer is greater than that of each of the battery cells, a through hole, through which each of the electrical connection members is inserted, is formed at a position corresponding to each electrode terminal connection region between the battery cells arranged in the longitudinal direction thereof, the grooves correspond to a width of each of the electrical connection members, at least one groove of the grooves of the spacer is formed in the longitudinal direction of the battery cells, at least one groove of the grooves of the spacer is a branch groove that diverges in the lateral direction of the battery cells from the longitudinally formed groove, in which each of the electrical connection members is bent so as to correspond to the groove and the branch groove, the battery cells are arranged in the longitudinal direction and in the lateral direction, and a protection circuit member is mounted to the outside of one lateral side of an assembly of the battery cells arranged in the longitudinal direction.

2. The battery pack according to claim 1, wherein each of the battery cells is a cylindrical battery cell, and the spacer has a width by which opposite sides of the spacer extend to middle regions of two neighboring battery cells, respectively.

3. The battery pack according to claim 2, wherein the spacer further comprises ribs configured to have a length corresponding to the distance between the middle region and the outside end of each of the battery cells and a shape corresponding to the outer circumference of each of the battery cells.

4. The battery pack according to claim 1, wherein each of the electrical connection members is a metal plate formed in the shape of a strip.

5. The battery pack according to claim 1, wherein the horizontal opening of the temperature detection member mounting part is open in the direction in which the battery cells are arranged.

6. The battery pack according to claim 5, wherein the horizontal opening comprises horizontal openings formed at opposite sides of the vertical opening.

7. The battery pack according to claim 1, wherein, in a state in which the temperature detection member is inserted through the horizontal opening of the temperature detection member mounting part, a bonding agent, a molten resin or a curable resin is injected through the vertical opening to fix a portion of the temperature detection member to the temperature detection member mounting part.

8. The battery pack according to claim 1, wherein the temperature detection member is a thermistor.

9. The battery pack according to claim 1, wherein a temperature detection member is connected to the protection circuit member.

10. The battery pack according to claim 1, wherein the pack case is provided with an injection port communicating with a vertical opening of the spacer.

11. A laptop computer comprising the battery pack according to claim 1 as a power source.

12. A battery pack, comprising:
a pack case;
battery cells in the pack case; and
a spacer mounted between the battery cells and the pack case, wherein the spacer is configured to have a top shape corresponding to the inner shape of the pack case in vertical section and a bottom shape corresponding to the outer circumferential shape of the battery cells in vertical section so that the spacer can be mounted in a space defined between the battery cells and the pack case, and grooves, in which electrical connection members are mounted, are formed at the top of the spacer, at least one groove of the grooves of the spacer is formed in the longitudinal direction of the battery cells, and at least one groove of the grooves of the spacer is a branch groove that diverges in the lateral direction of the battery cells from the longitudinally formed groove, in which each of the electrical connection members is bent so as to correspond to the groove and the branch groove, the spacer comprises at least one temperature detection member mounting part comprising a horizontal opening open in one direction or in opposite directions and a vertical opening communicating with the horizontal opening so that a temperature detection member is inserted from one side of the spacer and mounted in a space defined between the battery cells from one side of the spacer, the temperature detection member being inserted through the horizontal opening of the temperature detection member mounting part, one of a bonding agent, a molten resin and a curable resin is injected through the vertical opening to fix a portion of the temperature detection member to the temperature detection member mounting part, the battery cells are arranged in the longitudinal direction and in the lateral direction, and a protection circuit member is mounted to the outside of one lateral side of an assembly of the battery cells arranged in the longitudinal direction.

13. A battery pack, comprising:
a pack case;
battery cells in the pack case; and
a spacer mounted between the battery cells and the pack case, wherein the spacer is configured to have a top shape corresponding to the inner shape of the pack case in vertical section and a bottom shape corresponding to the outer circumferential shape of the battery cells in vertical section so that the spacer can be mounted in a space defined between the battery cells and the pack case, the bottom shape not covering both the top and the bottom of the battery cells, grooves, in which electrical connection members for directly connecting the battery cells are mounted, are formed at the top of the spacer, the spacer comprises at least one temperature detection member mounting part comprising a horizontal opening open in one direction or in opposite directions and a vertical opening communicating with the horizontal opening so that a temperature detection member is inserted from one side of the spacer and mounted in a space defined between the battery cells from one side of the spacer, the length of the spacer is greater than that of each of the battery cells, a through hole, through which each of the electrical connection members is inserted, is formed at a position corresponding to each electrode terminal connection region between the battery cells arranged in the longitudinal direction thereof, the grooves correspond to a width of each of the electrical connection members, at least one groove of the grooves of the spacer is formed in the longitudinal direction of the battery cells, and at least one groove of the grooves of the spacer is a branch groove that diverges in the lateral direction of the battery cells from the longitudinally formed groove, in which each of the electrical connection members is bent so as to correspond to the groove and the branch groove, wherein the battery cells are arranged in the longitudinal direction and in the lateral direction, and a protection circuit member is mounted to the outside of one lateral side of an assembly of the battery cells arranged in the longitudinal direction.

14. The battery pack according to claim 1, wherein the through hole, through which each of the electrical connection members is inserted, is formed at a position corresponding to each electrode terminal connection region between the battery cells that are arranged in a longitudinal direction of the spacer.

15. The battery pack according to claim 1, wherein the at least one groove of the grooves of the spacer formed in the longitudinal direction of the battery cells, the at least one groove extends from an end of the spacer.

* * * * *